Jan. 12, 1937. J. E. MAYHEW 2,067,200
CONFECTIONERY MAKING APPARATUS
Original Filed May 26, 1931 2 Sheets-Sheet 2
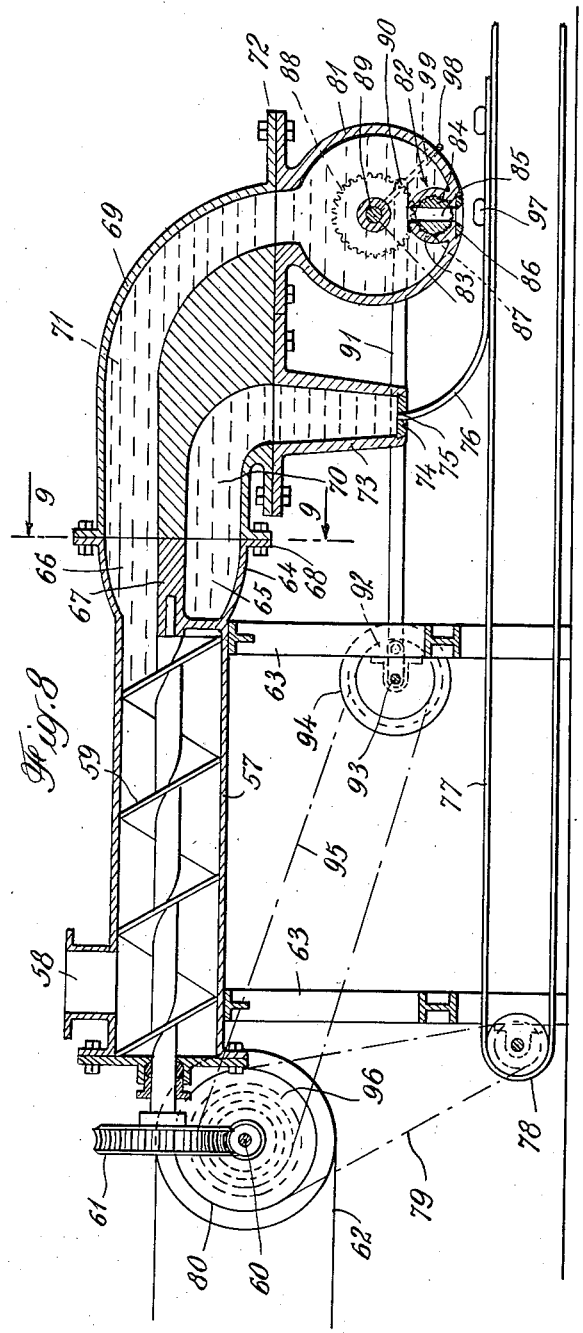
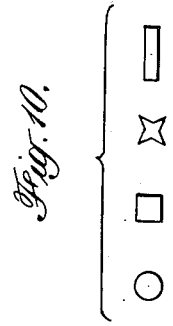
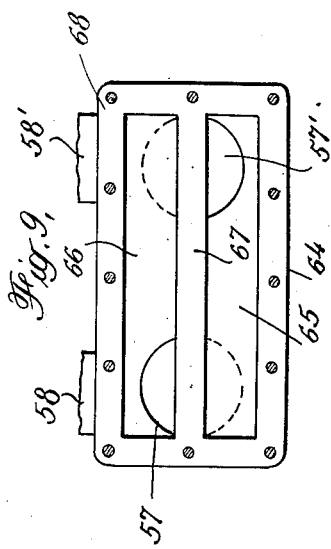
INVENTOR
James E. Mayhew
BY
Pennie, Davis, Marvin & Edmonds
HIS ATTORNEYS Patented Jan. 12, 1937

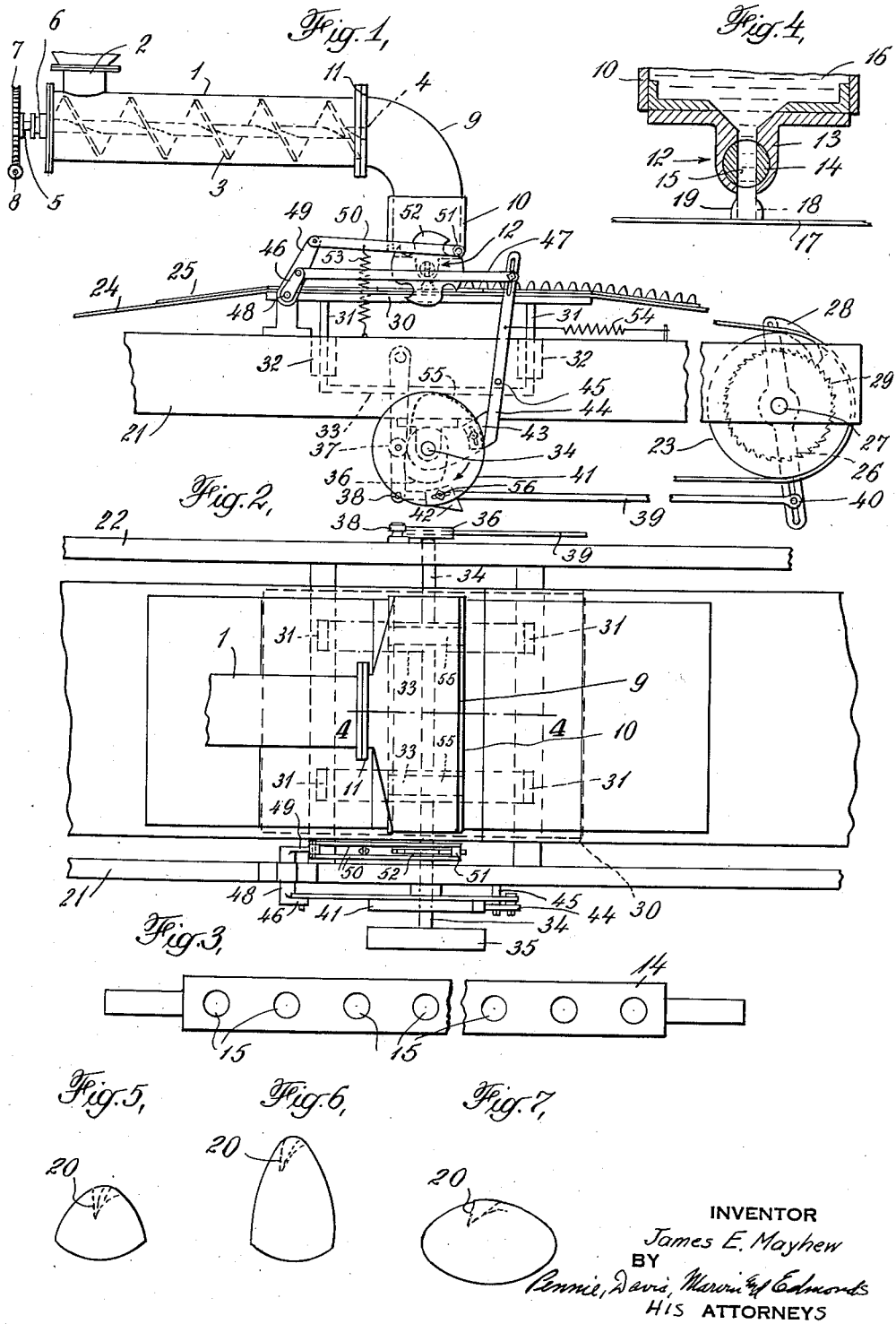

2,067,200

UNITED STATES PATENT OFFICE 2,067,200

CONFECTIONERY MAKING APPARATUS

James E. Mayhew, Upper Darby, Pa.

Application May 26, 1931, Serial No. 540,071
Renewed April 9, 1936

3 Claims. (Cl. 107—27)

This invention relates to improvements in the art of making confectionery. It is directed more particularly to the manufacture of confections from comparatively dry plastic material, that is, to the provision of an improved method and apparatus whereby confections are made from a comparatively dry plastic stock, instead of from a liquid or freely flowing stock.

The invention is intended primarily for the manufacture of confections such as licorice products, gum drops, hard creams, and the like. For example, licorice drops or pellets, and creams containing fibrous material such as cocoanut or crushed or ground nuts may be advantageously made according to the method and by means of the apparatus of the invention. If desired, however, the invention may also be employed in the making of confections of a soft character, such for example as caramels, caramel nut rolls, nougat bars, and products made of fruit or nut paste, marshmallow and the like.

Great difficulty has been experienced in the candy manufacturing industry in forming rapidly and in large quantities products made from a stock plastic material of a comparatively dry, tenacious and oftentimes rubbery consistency. For this reason in the manufacture of such products as licorice drops, gum drops, chocolate products, confectioner's paste and the like, it has been customary to use a liquid stock instead of a plastic stock in forming the candy shapes or drops. This liquid stock, usually a little heavier than syrup, is deposited by means of a plunger machine in molds of the size and shape of the product desired. These molds are made usually in a mold powder, such for example as starch.

A skilled operator is required to operate these depositing machines. Moreover, because there is so much moisture in the liquid stock, it requires from four to five days for the products to dry after being molded, depending to some extent upon the size of the drops. The mold powder is used over and over again, but because of the long drying time a very considerable amount of starch is required representing an appreciable amount of capital. In addition, specially constructed deep trays are necessary for holding the starch and a large number of these trays is required on account of the long drying time. This also adds to the capital investment. Furthermore, the starch must be cleaned from time to time and it is necessary to provide in the plant a starch purifying machine. All of these items in addition to the depositing machine not only are expensive, but occupy much room in the factory. My present invention aims to provide a method and apparatus for carrying out such method whereby these defects are effectively overcome.

The plastic stock material from which licorice candy is made according to the method and apparatus of the present invention, is of a doughy or rubbery consistency because of the comparatively large amount of flour and comparatively small amount of water which it contains. In order to give an idea of the consistency of the licorice dough which I have found advantageous to use, it may be said that this dough contains in the neighborhood of 29% of strong wheat flour, 25% of water, 38% of invert sugar and the rest licorice extract, coloring materials, and such other ingredients as may be desired to improve the texture and keeping qualities of the finished product. The amount of moisture in the mixture may vary for example from between about 20% and about 30%, but it will be understood that with this comparatively small amount of water the dough is difficult to handle, and, in fact, it is substantially impossible to form it by means of any of the processes or apparatus at present in use of which I am aware.

In carrying out the invention the plastic stock material is discharged through a die to shape the material to the desired cross section, the discharge being periodically interrupted to divide the material into portions of the desired size, such for example as drops or short bars. The material is fed to the die under an uninterrupted pressure, that is, the feeding pressure is of such a nature that it continues and builds up during the periods of interruption of the discharge through the die. When, therefore, the discharge is resumed after a period of interruption, the increase in pressure which has taken place causes the doughy or rubbery material to be extruded suddenly and smoothly through the die.

In order to aid in giving the extruded portions of the material a conical shape, like the usual form of licorice drop or gum drop, the material is subjected to lengthwise compression while still in contact with the die and preferably as it is being discharged from the die. The material is then divided or cut off from the mass of plastic material and the string broken which forms between the divided portion and the material adhering to the die.

In order to further modify the shape of the divided portion, it is preferably moved away from the die after compression, and the adhering of the upper part of the material to the die causes it to be drawn out into more pointed shape and also causes the breaking of the string which forms between the conically shaped piece and the material adhering to the die.

The invention will now be more fully described in connection with the accompanying drawings which illustrate by way of example various embodiments of the apparatus of the invention. In these drawings:

Figs. 1 to 4 inclusive illustrate an apparatus for making licorice drops of various shapes as shown in Figs. 5, 6, and 7.

Fig. 1 is a side elevation of this apparatus;

Fig. 2 is a top plan view of the apparatus;

Fig. 3 is a view of the movable part of the die; and

Fig. 4 is an enlarged fragmentary section taken on line 4—4 of Fig. 2 showing the die in open position.

Fig. 8 is a longitudinal section through a modified form of apparatus.

Fig. 9 is an end view taken on line 9—9 of Fig. 8 with the parts to the right of this line removed; and Fig. 10 is a view showing the cross sections of various die shapes that may be used in either form of machine.

Referring to the accompanying drawings and first to Figures 1 to 4 inclusive, the comparatively dry rubbery plastic stock material, for example licorice dough, is fed to the horizontal cylindrical pressure chamber 1 through the mouth 2. Within the pressure chamber 1 is a revolving screw 3 which serves as the feeding or pressure producing means. This screw is journaled at the right hand end at 4, and the left hand end of its shaft 5 passes through a stuffing box 6 in the end wall of cylinder 1. On the end of shaft 5 is a worm wheel 7 which is driven by worm 8 to which power is supplied by any suitable means (not shown). The pressure screw 3 is rotated continuously and uninterruptedly in a direction to cause the plastic stock material to be carried forward to the right from the mouth 2 where it passes through the elbow 9 into a die head 10.

As will be seen from Fig. 2, the elbow 9 has a circumferential flange 11 by which it is bolted to a similar flange on the right hand end of pressure cylinder 1, and widens out into a long narrow chamber extending transversely of the machine and coextensive in length with the die head 10.

The die, indicated generally by numeral 12, is mounted on the lower wall of the die head 10 and extends substantially throughout the length thereof or in other words crosswise of the machine. This die comprises a stationary part 13 and a movable part or valve-like portion 14 illustrated in detail in Fig. 3. From Fig. 3 it will be seen that the movable part of the die is a slender cylindrical member having a plurality of shaping apertures 15 extending through it and arranged in spaced relation throughout its length. Apertures corresponding in shape are provided in the stationary part 13 of the die. The shaping apertures 15 may be of any desired configuration, such for example as cylindrical, square, star-shaped, rectangular, etc., these shapes being shown in Fig. 10.

The movable part 14 of the die 12 is rotatable so as to close or cut off the passage through the die. This rotation of the die may be accomplished by hand or by any suitable automatic mechanism, such for example as that shown in Figs. 1 and 2, which will presently be described.

In accordance with the method of the present invention, the licorice dough or other plastic stock material 16 within the die head 10, is placed under pressure by the rotation of the screw 3, which, as stated above, rotates continuously. The movable part 14 of the die 12 is rotated or oscillated periodically from the position shown in Figs. 1 and 4 to a position approximately at right angles thereto, thereby interrupting the discharge of the material through the die. This periodic interruption of the discharge forces the pressure upon the plastic material 16 to build up, since the rotation of the screw 3 continues while the die is closed. Upon each opening of the die, the plastic material 16 is discharged through it on to a suitable tray 17 (Fig. 4) disposed a short distance beneath the die. As the material is of a stiff hard rubbery or dough-like consistency, it passes out through the circular die as shown in Fig. 4 in the form of a cylinder 18 as indicated by the dotted lines.

The excessive pressure built up in the plastic material 16 by the continued rotation of the screw 3 while the die is closed, aids in causing a rapid or sudden discharge of this cylinder 18 of material, and as the outer end of the cylinder 18 strikes the surface of tray 17, this pressure also aids in forcing out additional material which causes the cylinder 18 to expand into the partially formed "drop" 19. Then the movable part 14 of the die is again rotated to close the die and cut off or divide the extruded portion of material from the mass of material 16 within the die head. The top of the partially formed drop 19 of extruded material tends to adhere to the stationary part 13 of the die, and to separate the partially formed drop from the die. The tray 17 is lowered away from the die a sufficient distance to draw out the upper part of the partially formed drop into a string and break this string. This drawing out of the upper part of the extruded material completes the shaping of the drop into an approximately conical form as shown in Figs. 5, 6, and 7, the portion of the broken string which adheres to the drops being indicated by numeral 20. The longitudinal squeezing or compressing of the partially formed drop 19 between the tray 17 and the lower end of the die, may also be aided by raising the tray slightly while the material is being extruded.

The description of the remainder of the parts shown in Figs. 1 and 2 by which the formation of the drops is carried on automatically will now be completed. Two spaced frame members 21 and 22 extend along each side of the machine and carry at each end a pair of rolls, one of which is indicated at 23 for carrying a flexible conveyor 24. This conveyor moves toward the right and upon it the trays 25 are placed and are carried beneath the die head 10 and die 12 to receive the drops as they are formed and carry them forward. It will be understood that a row of drops is formed each time the die is opened, there being as many drops in each row as there are shaping apertures 15 in the die. The trays at the right hand half of conveyor 24 have received the rows of drops as indicated. The conveyor 24 is fed forward step by step, one row at a time, by means of the ratchet mechanism indicated at the right hand end of Fig. 1 which comprises an oscillating bar 26 which is pivoted upon the supporting shaft 27 of roller 23. This bar has a pawl 28 pivoted at its upper end which engages the teeth of a ratchet wheel 29 that is arranged to drive roller 23. Means by which bar 26 is oscillated will be described presently.

In traveling beneath the die head 10, conveyor 24 passes over a vertically reciprocating table 30 which reciprocates in timed relation with the opening and closing of the die 12 to assist in forming the drops. This table is carried upon four vertical legs 31 which slide in guides 32 that are supported upon cross members extending between the side bars 21 and 22. Each pair of these legs 31 is connected by a horizontal member 33.

The main operating shaft 34 of the machine extends crosswise beneath the frame members 21 and 22 and is mounted for rotation in suitable bearings. This shaft is driven continuously in the same direction in any convenient manner as for example by means of a belt passing over pulley 35. The opposite end of this shaft has upon it a cam 36 which coacts with a roller 37 carried by a lever 38 pivoted at its upper end to frame member 22. A connecting rod 39 is pivoted to the lower end of this lever and serves to cause the oscillation of oscillating bar 26 which advances the conveyor 24 step by step. A pin and slot connection 40 between the lower end of oscillating bar 26 and connecting rod 39 provides for an adjustment of the throw of ratchet 28 so as to vary the distance through which the conveyor is advanced in accordance with the size of the confectionery drops which are to be manufactured.

Keyed to shaft 34, at the same end thereof as pulley 35, is a cam disc 41 upon the periphery of which two cams 42 and 43 are mounted. These cams respectively effect the opening and closing of die 12 once during each revolution of shaft 34 by means of the lever and linkage mechanism illustrated in Figs. 1 and 2.

Cam lever 44 of this mechanism is pivoted to side frame 21 at 45, and the upper end of this lever is keyed with a crank 46 by means of a link 47. Crank 46 is mounted on the outer end of a short shaft 48 which is journaled in side frame 21 and on the inner end of this shaft a somewhat longer crank 49 is mounted. A pair of links 50 are pivotally connected to the upper end of crank 49, and at their opposite ends are joined by a pin 51 which is adapted to ride upon the surface of a notched wheel 52 that is keyed to one end of movable part 14 of the forming die 12. Pin 51 engages the four notches in the periphery of wheel 52 to actuate the same. A helical spring 53 aids in maintaining pin 51 in operative engagement with the notched wheel.

It will be understood that each time one of the cams 42 or 43 passes the lower end of cam lever 44, the upper end of this lever is moved toward the left and this motion is transferred to the double links 50 and pin 51 through cranks 46 and 49. This causes notched wheel 52 and movable part 14 of the die to be turned through an angle of 90°, thereby causing the die to be first opened and then closed. The return movement of the lever and link mechanism, after actuation thereof by cams 42 and 43, is effected by means of a helical spring 54 which acts upon the upper portion of cam lever 44.

In order to raise and lower table 30 as above referred to, the horizontal members 33 which connect the two pairs of upright legs 31 coact at their central portions with a pair of cams 55 which are mounted on the central part of shaft 34.

In the operation of the apparatus, the pressure producing screw 3 is operated continuously through the application of power to the shaft of the worm 8, and shaft 34 is also rotated continuously by means of the belt which drives pulley 35. Shaft 34 and feeding screw 3 may be operated from the same source of power, but they are not operated in timed relation, screw 3 being operated continuously even when die 12 is closed.

As shown in Fig. 1, cam 43 is in contact with the lower end of cam lever 44, and rotating in the direction of the arrow, that is, clockwise, is just about to effect the closing of die 12 by the rotation of the movable part 14 thereof through the mechanism above described. This stops the further extrusion of the licorice dough or other plastic material and the drop 19 is in the shape indicated in Fig. 4.

As soon as cam 43 passes the end of lever 44, spring 54 returns the parts of this mechanism to their original position as shown in the drawings. The continued rotation of shaft 34 causes the lowering of table 30 by means of cams 55 thereby drawing out the upper portion of the drop 19 into a string, part of the extruded material adhering to the stationary part 13 of the die. This drawing out completes the conical formation of the drop, the conical form being started through the compression of the material after extrusion, as referred to previously. Simultaneously with the lowering of table 30 cam 36 on shaft 34 causes the movement of lever 38, connecting rod 39, oscillating bar 26 and pawl 28 to cause the flexible conveyor 24 to be fed forward a sufficient distance to remove the row of drops just formed from beneath the die 12 so that the tray will be ready to receive the next row of drops. This forward movement of the drops just formed aids the downward movement in stretching the string of plastic material to and beyond the breaking point so that the string will be broken and the lower portion of it will fall by gravity against the side of the drop and merge with the surface thereof. This forms a decoration on the side of the drop similar to the string which is always present on hand dipped chocolates.

It will be understood that the angular position of cams 55 and cam 36 with respect to each other and also with respect to cams 42 and 43 may be varied somewhat depending upon the physical characteristics of the plastic material 16, and the shape of the drop which it is desired to produce.

During the time that shaft 34 rotates from the position where cam 43 has just passed beyond the lower end of lever 44, until the time that the front or lower surface of cam 42 comes into contact with lever 44, die 12 remains closed, and during this time the pressure upon the plastic material 16 is being built up under the continued rotation of screw 3. There is sufficient elasticity in the licorice dough, and the other plastic materials, within the contemplation of this invention, so that while the die remains closed the material is compressed slightly thereby allowing the pressure upon the material to build up without damaging the apparatus or causing the stalling of the feed screw.

As cam 42 coacts with lever 44, die 12 is again suddenly opened and the plastic material 16 is again extruded, the increase in pressure which has been built up during the time which the die was closed aiding in forcing the material through the die quickly and smoothly.

Just before the opening of the die by cam 42, cams 55 have again raised table 30 to the position indicated in Figs. 1 and 4, and as the plastic material passes through the die, the cylinder 18 thereof (Fig. 4) strikes the upper surface of tray 17 and then expands into the conical drop 19 under the continued pressure of extrusion. The extrusion continues completing the expansion of the drop to the size indicated at 19 by the time that cam 43 again coacts with lever 44 to close the die. Thereafter the completion of the formation of the drop, and the breakage of the string at the top of the same continues after the manner above described.

It will be observed that the entire movement of the movable portion 14 of the die from open to closed position or vice versa, takes place during a comparatively small angular movement of shaft 34, because of the arrangement of the die actuating mechanism. In order to adjust the position of cams 42 and 43 angularly with respect to one another and with respect to cams 55, they are adjustably mounted upon the periphery of cam disc 41 as indicated by the adjusting screws 56 and the slots adjacent thereto.

After the adjustment of the machine to form the desired size and shape of drop, its operation is substantially automatic. It is only necessary to provide an operator to keep the pressure chamber 1 supplied with licorice dough, and possibly another operator to see that the trays 25 are placed upon the flexible conveyor 24 at the left hand end of the machine, and the filled trays removed therefrom at the opposite end.

Contrasting my improved method with the method referred to above in which liquid stock material is used, the method of the present invention is simpler and more economical. The use of a molding powder such as starch has been eliminated and as a consequence a cause of extremely unsanitary conditions in the factory has been removed since this molding powder tends to accumulate dust, dirt and vermin, and must be carefully purified if an attempt is made to maintain sanitary conditions. The elimination of molding powder necessarily eliminates the use of a purifying machine with the attendant first cost, operation and upkeep.

The trays which are used with the improved apparatus of the present invention are merely flat sheets of metal and consequently are inexpensive as compared to trays required for molding powder. Of greatest importance to the manufacturer is the reduction in drying time since by the employment of my invention only two to three days is required for drying in place of from four to five days, thus reducing the drying time by approximately one-half. The fact that with all these advantages a product of great uniformity is produced, makes the invention of considerable value.

Referring now to the modified form of my improved apparatus illustrated in Figs. 8 and 9, there is here shown a machine which is intended to produce drops somewhat similar to those produced by the apparatus previously described, and to deposit the same upon a continuous strip of material also formed by the machine.

As shown in Figs. 8 and 9, the apparatus comprises a pair of pressure chambers 57 and 57' mounted side by side and each provided with a separate mouth 58 and 58' for feeding the plastic material thereto, and also each provided with separate screws 59 for placing the plastic material under extrusion pressure. The two screws 59 are both driven from the same shaft 60 at the left hand end of the machine by means of a worm and gear drive 61 for each of the screw shafts. Shaft 60 may be driven in any suitable manner, as for example by means of a belt 62.

The two pressure chambers 57 and 57' of the driving mechanism just referred to, are appropriately supported on a framework 63 and the right hand ends of the pressure chambers 57 and 57' are connected by a cross member 64 (see Fig. 9), preferably formed integrally with the ends of the chambers 57 and 57'.

Cross member 64 is provided with a pair of transversely extending parallel passageways 65 and 66, these passageways preferably being rectangular in shape as shown in Fig. 9. They are separated by a transverse partition wall 67, and the lower passage is in communication with the right hand pressure chamber 57', that is, the pressure chamber which is farthest from the observer in Fig. 8. The upper transverse chamber 66 is in communication with the left hand pressure chamber 57.

The right hand end of the cross member 64 is flanged as indicated at 68, so that an elbow 69 may be bolted thereto. This elbow is preferably a casting of the same width as cross member 64, and contains two passages 70 and 71 which are adapted to communicate respectively with passageways 65 and 66 when the elbow is bolted to the cross member. Elbow 69 terminates in a horizontal flanged face 72, and upon this face, die heads of various constructions may be mounted.

As shown in Fig. 8, a die head 73 is bolted onto face 72 in communication with passage 70 which is provided with a stationary die 74 having a plurality of die openings 75. It will be understood that these die openings may be of any desired shape, such for example as the shapes illustrated in Fig. 10, and the die opening 75 illustrated in Fig. 8 is of a rectangular shape similar to that shown at the right hand of Fig. 10. The extrusion of plastic material through this die hence causes the formation of a plurality of strips 76 arranged side by side throughout the width of the machine. These strips as they are formed are received upon a travelling flexible conveyor 77 which passes around a roller 78 by which it is driven. Roller 78 is in turn driven by means of a belt 79 from a pulley 80 on shaft 60.

On flanged face 72 of elbow 69 opposite passage 71, there is mounted a second die head 81 which has a body which is of substantially the same length as the width of cross member 64 and which is circular in cross section as shown in Fig. 8. In the lower portion of this die head there is a valved die indicated generally by numeral 82 similar to die 12 of Figs. 1 and 4 and having a stationary portion 83 and a movable portion 84. Die 82 is provided with a plurality of shaping apertures 85 arranged in spaced relation throughout the length of the die and registering with the centers of the spaced die openings 75 so that as plastic material is extruded from die 82 it will be deposited upon the strips 76 of plastic material formed by the stationary die openings 75.

The cross sectional shape of the material discharged through the shaping apertures 85 of die 82 may be varied by changing the shape of these apertures 85 as desired. Thus these apertures 85 may be of any of the cross sectional shapes indicated in Fig. 10, or of any other suitable shape. As shown in Fig. 8, however, they are cylindrical, and the shape of the extruded material is determined by means of a secondary die 86 which is removably mounted in the lower surface of die head 81 in proximity to die 82. Secondary die 86 preferably consists of a thin flat strip of metal having dove-tailed edges and received in a dove-tailed slot formed in the surface of die head 81. As shown in Fig. 8 this secondary die strip 86 has a plurality of circular and preferably flaring openings therein, one for each forming aperture 85 of die 82. These apertures, however, instead of being circular may be made square, star-shaped, or rectangular, as indicated in Fig. 10, or in any other suitable shape, and in this way the shape of the extruded material may be quickly varied by simply removing strip 86 and inserting in its place another secondary die strip containing apertures of the shape desired.

In order to actuate the movable portion 84 of die 82 to open and close the same, a pinion 87 is mounted upon one end thereof which meshes with a gear 88 having twice as many teeth as the pinion. Gear 88 is keyed to a shaft 89 which preferably extends from end to end of die head 81. A crank pin 90 is mounted on the side of gear 88 and a connecting rod 91 is pivoted at one end to crank pin 90 and at the other end to a crank 92 causing gear 88 to be oscillated through an angle of 90° as indicated by the dotted lines in Fig. 8.

Crank 92 is rotated continuously in the same direction, being mounted upon a shaft 93 to which is keyed a stepped pulley 94 that is driven by means of a belt 95 from a similar stepped pulley 96 which is mounted upon shaft 60. Hence by changing belt 95 upon the stepped pulleys 94 and 96 the frequency of the opening of die 82 may be varied with respect to the speed of the pressure screws 59.

Inasmuch as pinion 87 has half as many teeth as gear 88, while gear 88 is being oscillated through an angle of 90°, pinion 87 and consequently the movable part 84 of die 82 will be oscillated through an angle of 180°. Moreover, as shown in Fig. 8, the parts are so arranged that die 82 is in the open position when the crank 92 is at each end of its stroke, so that the valve 82 will stay in the open position a sufficient length of time to permit the discharge of a drop 97 each time the valve is opened. It will be understood, however, that if desired a cam operated die actuating mechanism similar to that shown in Fig. 1 may be employed to actuate die 82.

In the modified form of apparatus shown in Fig. 8, instead of lowering the drop away from the die in order to separate the drop therefrom, I employ a cutting wire 98 which extends longitudinally of the die head 81 close to the surface thereof and is mounted upon the outer ends of a pair of arms 99, one mounted at each end of shaft 89. Cutting wire 98 thus is made to oscillate with the gear 88 through an angle of 90°, and since it is mounted in the same angular position as the crank pin 90, it sweeps over the mouth of the die shortly after it has been turned to closed position. This movement takes place during each stroke of connecting rod 91.

It will be observed that in the operation of this modified form of apparatus, as well as in the form shown in Fig. 1, the pressure screws 59 are operated continuously, that is, while the die 82 is closed as well as while it is open. Hence there is a building up of pressure within the mass of plastic material in the machine while the die is closed, and this aids in extruding the material through the die when it is opened suddenly and smoothly, and enables the apparatus to be used for the formation of candy of various shapes from comparatively hard and dry plastic material such for example as licorice dough, and hard creams.

The modified form of apparatus shown in Fig. 8 is adapted not only for the purpose of depositing licorice drops upon the strips of licorice which may be later separated into bars, the drops forming decorations on the bars, but it may be used wherever it is desired to deposit one material upon another. Thus, for example, a cocoanut or other nut mixture may be extruded in drops upon either a soft or hard cream or other material. Also materials of different colors may be deposited, the one upon the other. Furthermore, while these machines of my present invention are primarily intended for the formation of confections from comparatively hard plastic materials which have been heretofore found extremely difficult to handle, they may also be used, if desired, in making confections from soft materials. For example, caramel may be extruded from die opening 75 and hard nut mixture may be extruded from die head 81, thus forming a caramel nut confection. Also a caramel and nougat confection could be similarly made. Also die head 81 may be used for marshmallow depositing or for fruit paste or for nut paste depositing.

It will be understood also that if desired the die head 81 may be operated by itself to produce substantially the same materials as may be produced by means of the form of apparatus shown in Figs. 1 and 2.

It is to be understood that while the invention has been described in connection with the specific examples above referred to, it extends to such variations in design as fall within the scope of the appended claims.

I claim:

1. In a machine for making confectionery, a plurality of pressure chambers disposed side by side, a conveyor, a plurality of die heads arranged crosswise of said conveyor, a conduit connecting each of said pressure chambers with one of said die heads, and said die heads each supporting a plurality of dies, the dies on the respective heads being in alignment with one another so that as the material discharged by the dies of the first die head is carried along by the conveyor, the material discharged from the dies on the succeeding die heads is superposed thereon.

2. In a machine for making confectionery, a chamber for plastic material, a die connected therewith having coacting stationary and movable parts, means for periodically actuating the movable part thereof to open and close the die, pressure means in said chamber operating continuously to cause a building up of pressure while the die is closed followed by a sudden extrusion of material when the die is opened, and a mechanically actuated arm moving close to the mouth of the die for freeing the extruded material from the die.

3. In a machine for making confectionery, a chamber for plastic material, a die connected therewith, pressure means in said chamber for forcing said material through the die, a rotary valve for controlling the discharge of said material through said die, means for periodically rotating said valve through an angle of 180° to close and reopen the same, an arm pivoted to swing close to the mouth of said die, and means for causing the oscillation of said arm through about one-half of the said operating angle of said rotary valve.

JAMES E. MAYHEW.